US011455663B2

(12) United States Patent
Kaul et al.

(10) Patent No.: US 11,455,663 B2
(45) Date of Patent: Sep. 27, 2022

(54) SYSTEM AND METHOD FOR RENDERING ADVERTISEMENTS USING LOOKALIKE MODEL

(71) Applicant: Walmart Apollo, LLC, Bentonville, AR (US)

(72) Inventors: Vivek Kaul, Mountain View, CA (US); Shankara Bhargava Subramanya, Santa Clara, CA (US); Jingsi Zhang, Evanston, IL (US)

(73) Assignee: WALMART APOLLO, LLC, Bentonville, AR (US)

( * ) Notice: Subject to any disclaimer, the term of this patent is extended or adjusted under 35 U.S.C. 154(b) by 509 days.

(21) Appl. No.: 15/884,217

(22) Filed: Jan. 30, 2018

(65) Prior Publication Data
US 2019/0236652 A1   Aug. 1, 2019

(51) Int. Cl.
*G06Q 30/02* (2012.01)
*G06N 5/04* (2006.01)
*G06F 16/903* (2019.01)

(52) U.S. Cl.
CPC ..... *G06Q 30/0276* (2013.01); *G06Q 30/0255* (2013.01); *G06Q 30/0269* (2013.01); *G06F 16/90335* (2019.01); *G06N 5/04* (2013.01)

(58) Field of Classification Search
CPC .......... G06Q 30/0255; G06Q 30/0269; G06Q 30/0276; G06N 5/04
USPC ............................... 705/14.53, 14.66, 14.72
See application file for complete search history.

(56) References Cited

U.S. PATENT DOCUMENTS

| | | | | |
|---|---|---|---|---|
| 6,266,649 | B1* | 7/2001 | Linden | G06Q 30/02 |
| | | | | 705/26.7 |
| 10,956,986 | B1* | 3/2021 | Ran | G06Q 40/12 |
| 2008/0228568 | A1* | 9/2008 | Williams | G06Q 30/0277 |
| | | | | 705/14.39 |
| 2010/0280882 | A1* | 11/2010 | Faith | G06Q 30/0269 |
| | | | | 705/7.37 |
| 2017/0046426 | A1* | 2/2017 | Pearce | G06F 16/337 |
| 2017/0053208 | A1* | 2/2017 | Krishnamurthy | G06F 16/9024 |
| 2017/0193390 | A1* | 7/2017 | Weston | G06N 3/08 |

(Continued)

OTHER PUBLICATIONS

Huang, Zan, et al., Applying Associative Retrieval Techniques to Alleviate the Sparsity Problem in Collaborative Filtering, ACM Transactions on Information Systems, vol. 22, No. 1, Jan. 2004, pp. 116-142 (Year: 2004).*

(Continued)

*Primary Examiner* — Scott D Gartland
(74) *Attorney, Agent, or Firm* — Duane Morris LLP; Manita Rawat (57) ABSTRACT

A system for targeting advertising comprises a processor configured to compute a similarity score between a plurality of customers in a seed set and each of a pool of in-store purchasers having no history of online purchases from the online store of an entity. Each user in the seed set has a history of online purchases from the online store of the entity and a history of in-store purchases from stores of the entity. The processor is configured for selecting a subset of the pool of in-store purchasers having similarity scores above a predetermined threshold. The processor is configured for initiating rendering of advertisements for the online store to the subset of the pool of in-store purchasers.

20 Claims, 6 Drawing Sheets

(56) References Cited

U.S. PATENT DOCUMENTS

2019/0080352 A1* 3/2019 Modarresi ............... H04L 67/22

OTHER PUBLICATIONS

Ma et al., "Score Look-alike Audiences," Dec. 2016, 2016 IEEE 16th International Conference, Data Mining Workshops (ICDMW). 10 pages.

* cited by examiner

SYSTEM AND METHOD FOR RENDERING ADVERTISEMENTS USING LOOKALIKE MODEL

FIELD

This application relates generally to computer networks and more specifically to a system for accessing and mining a database containing information on a population of computer users.

BACKGROUND

Electronic commerce has become an important component of marketing and sales for retail brick-and-mortar store owners. Instead of having their sales siphoned off by online competitors, retailers can also compete in the online ecosystem.

SUMMARY

According to one aspect, a system for targeting advertising comprises: a processor configured to compute a similarity score between a plurality of customers in a seed set and each of a pool of in-store purchasers having no history of online purchases from an online store of an entity. Each user in the seed set has a history of online purchases from the online store of an entity and a history of in-store purchases from stores of the entity. The processor is configured for selecting a subset of the pool of in-store purchasers having similarity scores above a predetermined threshold. The processor is configured for initiating rendering of advertisements for the online store to the subset of the pool of in-store purchasers.

According to another aspect, a method for targeting advertising comprises: training a computer-implemented look-alike model with a training sample including a first plurality of customers. Each of the first plurality of customers has a history of online purchases from an online store of an entity and a history of in-store purchases from one or more stores of the entity. The trained look-alike model computes a similarity score between a seed set including a second plurality of customers and each in-store purchaser within a pool of in-store purchasers having no history of online purchases from the online store of the entity. Each of the second plurality of customers has a history of online purchases from the online store of the entity and a history of in-store purchases from one or more stores of the entity. A subset of the pool of in-store purchasers having similarity score above a predetermined threshold are selected. Rendering of advertisements is initiated for the online store to the subset of the pool of in-store purchasers.

According to another aspect, a non-transitory, machine readable storage medium is encoded with program instructions, such that when the program instructions are executed by a processor, the processor performs a method. The method comprises: training a computer-implemented look-alike model with a training sample including a first plurality of customers, each of the first plurality of customers having a history of online purchases from an online store of an entity and a history of in-store purchases from stores of the entity; using the trained look-alike model to compute a similarity score between a seed set including a second plurality of customers and each in-store purchaser within a pool of in-store purchasers having no history of online purchases from the online store of the entity, where each of the second plurality of customers has a history of online purchases from the online store of an entity and a history of in-store purchases from one or more stores of the entity; selecting a subset of the pool of in-store purchasers having similarity score above a predetermined threshold; and initiating rendering of advertisements for the online store to the subset of the pool of in-store purchasers.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Systems and methods described below can assist a retailer in converting brick-and-mortar store customers (referred to herein as "in-store customers") to online customers at a web site associated with the retailer through display ads. In some embodiments, the system and method identify a subset of in-store customers who have not made online purchases from the retailer's online store, but who share attributes with a pool of customers who have made both in-store and online purchases. The retailer can then target the subset of the pool of in-store customers for online advertising promoting the retailer's online store.

In some embodiments, a computer-implemented look-alike model is trained with a training sample including purchase histories for a first plurality of customers. Each of the first plurality of customers has a history of online purchases from an online store of the retailer and a history of in-store purchases from brick-and-mortar stores of the retailer. The available training data are divided into a training set and a test set (e.g., a 70%/30% split of a larger training set and smaller test set) from the pool of customers with both online and store records. A logistic regression model is trained on the training set and learns weights corresponding to store and demographic pairwise similarity features with the target of online similarity. The test set can be used to determine whether the model is performing well.

After training is completed, a new seed audience—which also has customers with both online and store features—is chosen according to the desired online behavior. The seed audience may or may not overlap with the training set and test set used for determining the weights of the look-alike model. Using the weights of the look-alike model obtained during training, the look-alike model can compute similarity between the seed audience customers (who have both in-store and online purchase histories) and the target customers with store purchase histories, but without online purchase histories. A k-d tree and local sensitive hashing can be used to improve the scalability and running time of the similarity computation.

Note: the training is done separately to arrive at a look-alike model with the right weights. After completion of training, a seed audience can be selected by the retailer which has both online and store features, and the lookalike model computes a similarity score between customers in the seed audience and each in-store purchaser within a pool of in-store purchasers having no history of online purchases. The retailer initiates the rendering of advertisements for the online store to the subset of the pool of in-store purchasers.

Figure 1:
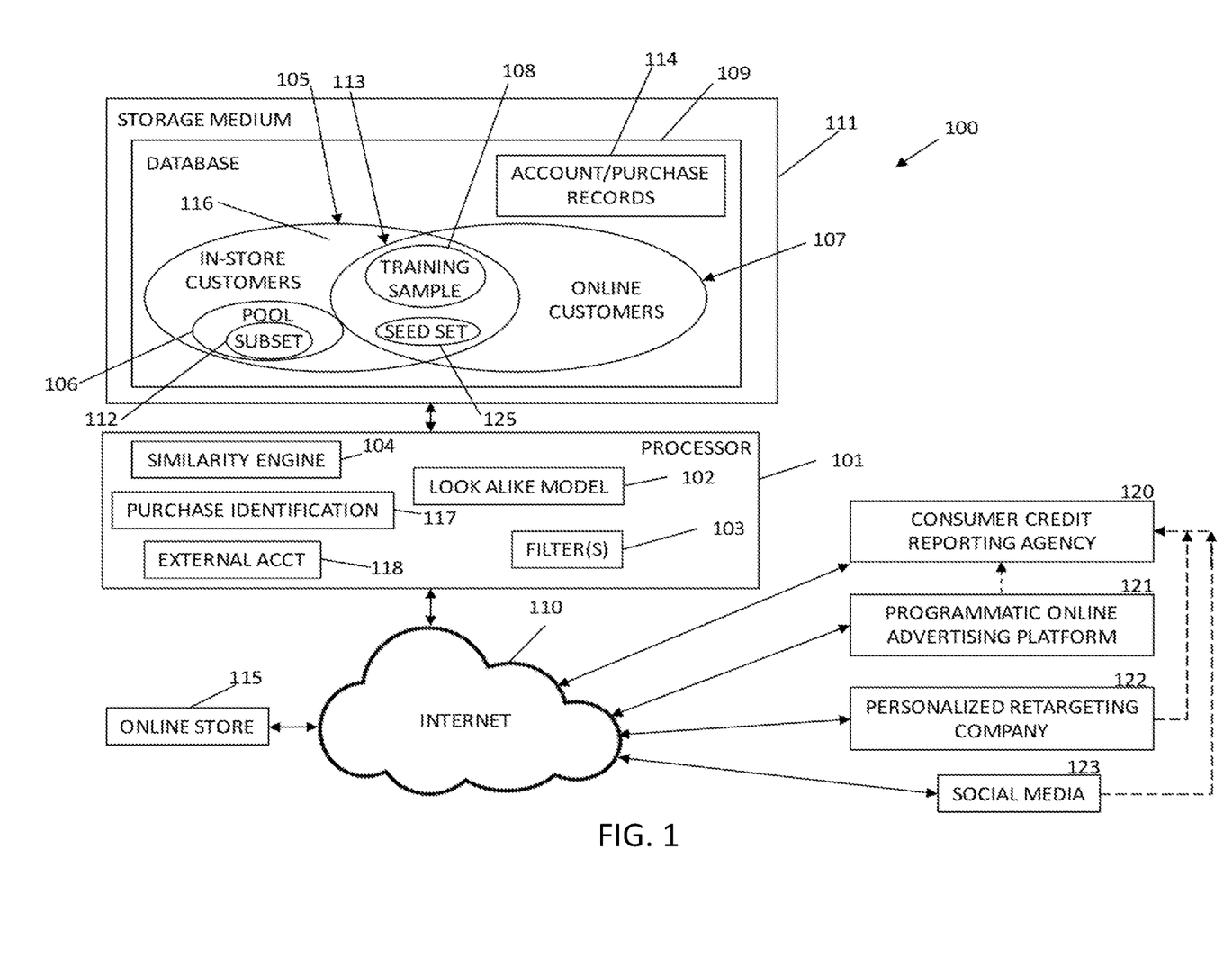
FIG. 1 is a block diagram of an exemplary system according to this disclosure.

FIG. 1 is a block diagram of an exemplary system 100 for targeting advertising according to some embodiments. The system 100 comprises a processor 101. The processor 101 can access a non-transitory, machine-readable storage medium 111 containing a database 109. The database 109 contains customer account records 105, 107 and purchase records 114. The customer account records 105, 107 are represented schematically as a Venn diagram in FIG. 1, but the database record format for all of the customer account records 105, 107 can be the same as each other. The customer account records include records for in-store customers 105 who have a history of in-store purchases at the retailer's brick-and-mortar store(s) and records for online customers 107 who have a history of online purchases at the retailer's online store 115, which can be a Worldwide Web site, via the Internet 110. The intersection 113 of in-store customers 105 and online customers 107 includes customers who have histories of in-store purchases at the retailer's brick-and-mortar store(s) and online purchases at the retailer's online store 115. Thus, a population 116 of the in-store customers 105 have no histories of online purchases at the retailer's online store 115.

One aspect of the look-alike model 102 is to identify a correlation between characteristics of a member of the population 116 and corresponding characteristics of the group 113 of customers who have both in-store and online purchase histories at the retailer's brick-and-mortar and online stores, respectively. In some embodiments, the look-alike model 102 is trained using the group 113 of customers or a subset of the group 113 constituting a training sample 108 containing a first plurality of customers. After training, a seed set 125 having a second plurality of customers is selected from the intersection group 113 of customers who have both in-store and online purchase histories. The second plurality of customers in the seed set 125 may differ from (or overlap with) the first plurality of customers 108 in the training set. The look-alike model 102 can compute a metric indicative of whether a member of the population 116 (or a filtered subset within the population 116, constituting a pool 106) has similar in-store purchase behavior with members of the seed set 125 of customers who have both in-store and online purchase histories.

In some embodiments, the processor 101 has a purchase identification engine 117 which accesses internal purchase records 114 to obtain information regarding in-store purchasing histories of the in-store customers 105.

In some embodiments, the processor 101 executes one or more filters 103 to pre-filter the population 116 and identify a smaller pool 106 of customers to be processed by the look-alike model 102. The pre-filtering can identify criteria that can be used quickly to reduce the fraction of the population 116 to be processed by the look-alike model 102. For example, the filters 103 can select members of the pool 106 based on age, gender, size of household, or other demographic attribute that may be correlated with the likelihood of converting an in-store customer to an online customer. In other embodiments, the filters 103 filter the population 116 of in-store purchasers having no history of online purchases from the online store 115 of the entity, such that each in-store purchaser in the pool 106 has purchased at least one item from a selected class of items. For example, if an advertising campaign is directed to baby food, the filter 103 can exclude from the pool 106 any in-store customer who has not purchased any baby products.

The processor 101 has a similarity engine 104 configured to compute a similarity score between a plurality of customers in a seed set 125 and each of the pool 106 of in-store purchasers having no history of online purchases from the online store 115 of an entity (e.g., a retailer or distributor). In some embodiments, the similarity score is based on the similarity between the in-store purchases of the customers in the pool 106 (or filtered subset 112) and the in-store purchases of the customers in the seed set 125. The higher the similarity score, the greater the likelihood that the in-store customer can be converted to an online customer. The similarity engine 104 is trained using a training sample 108. Each user in the training sample 108 has a history of online purchases from an online store 115 of the entity and a history of in-store purchases from stores of the entity. In some embodiments, the training sample 108 contains a proper subset containing fewer than 100% of the customers who have in-store purchase histories with the entity and online purchase histories with the entity (The remaining customers who have in-store and online purchase histories with the entity but are not included in the training sample 108 can be used to test the look-alike model after training. In some embodiments, the pool 106 is a proper subset containing fewer than 100% of the in-store customers 116 who do not have any history of purchases from the retailer's online store 115.

In some embodiments, the processor 101 is configured for selecting a subset 112 of the pool 106 of in-store purchasers having similarity scores (with respect to the seed set 125) above a predetermined threshold. The threshold can be adjusted by the user, based on the advertising budget. If the advertising budget is high enough to target a large fraction of the pool 106 with advertising, the threshold is set to a low value close to zero. If the advertising budget is low, and the user wishes to target only a small fraction of the pool 106 having the greatest likelihood of conversion, the threshold is set to a low value close to zero. Once the threshold is applied, and the subset 112 of the pool 106 to be targeted by advertising is identified, the processor can initiate rendering of advertisements for the online store to the subset 112 of the pool of in-store purchasers. For example, the processor 101 can automatically execute an electronic order for online advertising to the target audience in the subset 112.

For example, external account identification engine 118 can access information from a consumer credit reporting agency 120 (e.g., Experian) identifying platforms on which the subset 112 of the pool 106 of customers have valid accounts. The identification (ID) information in the Experian records can map from store purchases to user IDs on social media 123 (e.g., Facebook IDs). Similarly, external account identification engine 118 can access information from Experian regarding other platforms 121, 122 where a map is available to connect in-store customer ID to online ad platform ID. External account identification engine 118 can link identities through credit card purchases. For example such information can be obtained from a programmatic online advertising platform 121 (e.g., AppNexus) or a personalized retargeting company 122 (e.g., Criteo). External account identification engine 118 can store the account records it obtains in the account/purchase records 114 of database 109. Having identified accounts of the in-store customers in the subset 112 of the pool 106, the processor 101 determines which of these accounts coincide with advertising platforms of the entity's online store 115. The processor can then initiate the advertisements on those platforms.

Figure 2:
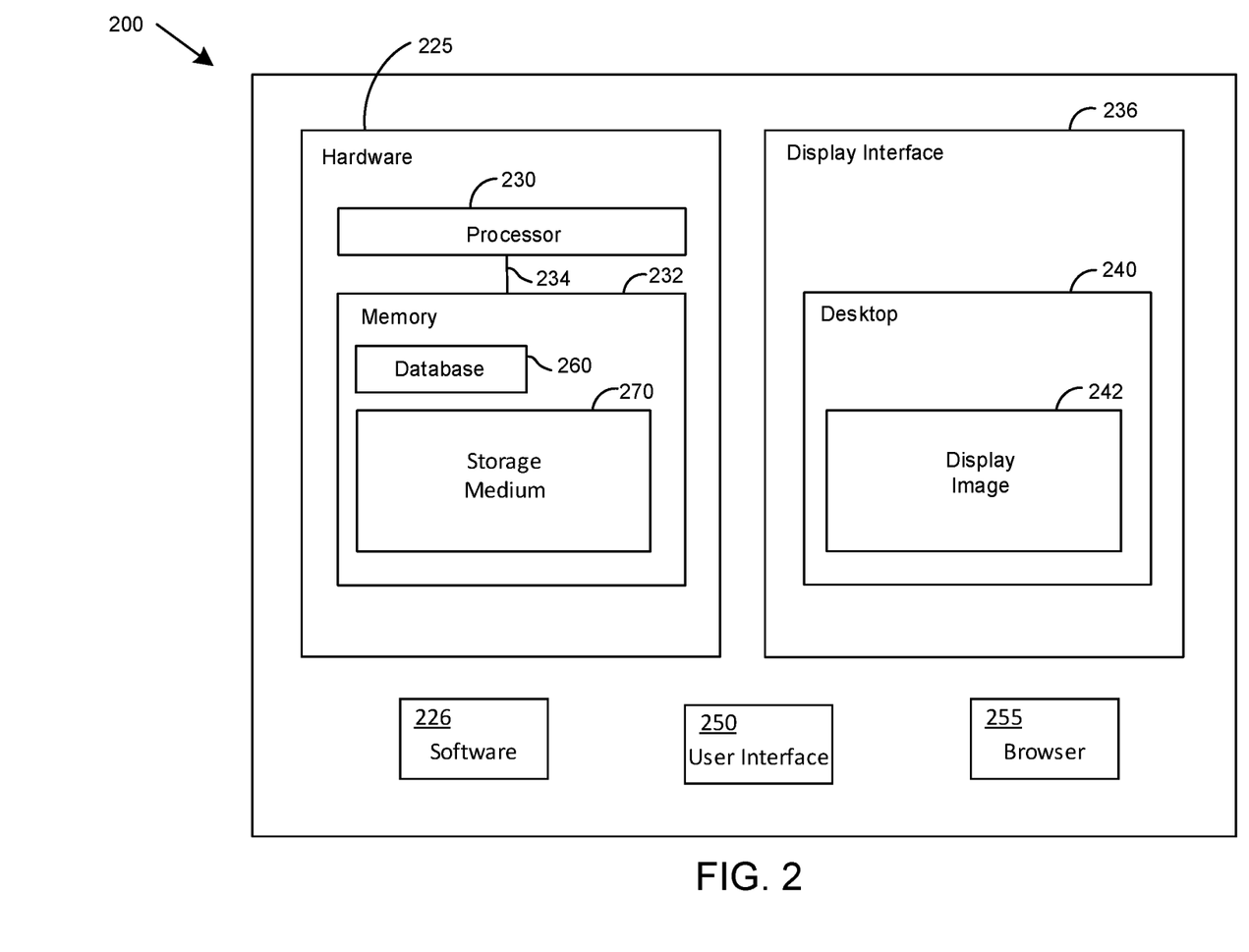
FIG. 2 is a block diagram of an exemplary computer system suitable for the processor of FIG. 1.

FIG. 2 is a block diagram of an exemplary computing device 200, which may be used to implement computing device 101 (FIG. 1) and/or server processor 107. In some embodiments, computing device 200 includes a hardware unit 225 and software 226. Software 226 can run on hardware unit 225 such that various applications or programs can be executed on hardware unit 225 by way of software 226. In some embodiments, the functions of software 326 can be implemented directly in hardware unit 225, e.g., as a system-on-a-chip, firmware, field-programmable gate array ("FPGA"), etc. In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), a programmable gate array (PGA), and/or any other programmable circuit. Alternatively, processor 230 may include multiple processing units (e.g., in a multi-core configuration). The above examples are exemplary only, and, thus, are not intended to limit in any way the definition and/or meaning of the term "processor."

Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit SDRAM, and/or a few GB of RAM. Memory 232 can also be a ROM, a network interface (NIC), and/or other device(s).

In some embodiments, computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, display image 242 can be presented to a user on computer displays of a remote terminal (not shown). For example, computing device 200 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 200.

In some embodiments, computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used. Computing device 200 can also include a web browser 255, such as "CHROME" from Google, LLC of Mountain View, Calif., "SAFARI" from Apple Inc. of Cupertino, Calif., "FIREFOX" from Mozilla Foundation of Mountain View, Calif., or the like. The web browser 255 (referred to below the browser) is a software application for retrieving, presenting and traversing information resources on the World Wide Web or a web server in a private network. The browser 255 can render content (e.g., images), audio, video, and XML files, and may have plug-ins to support Flash applications and Java applets. An information resource is identified by a Uniform Resource Identifier (URI/URL) that may be a web page, image, video or other piece of content.

Computing device 200, in some embodiments, can include a database 260 within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage media 270 (only one being shown in FIG. 2). Computer storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

Figure 3:
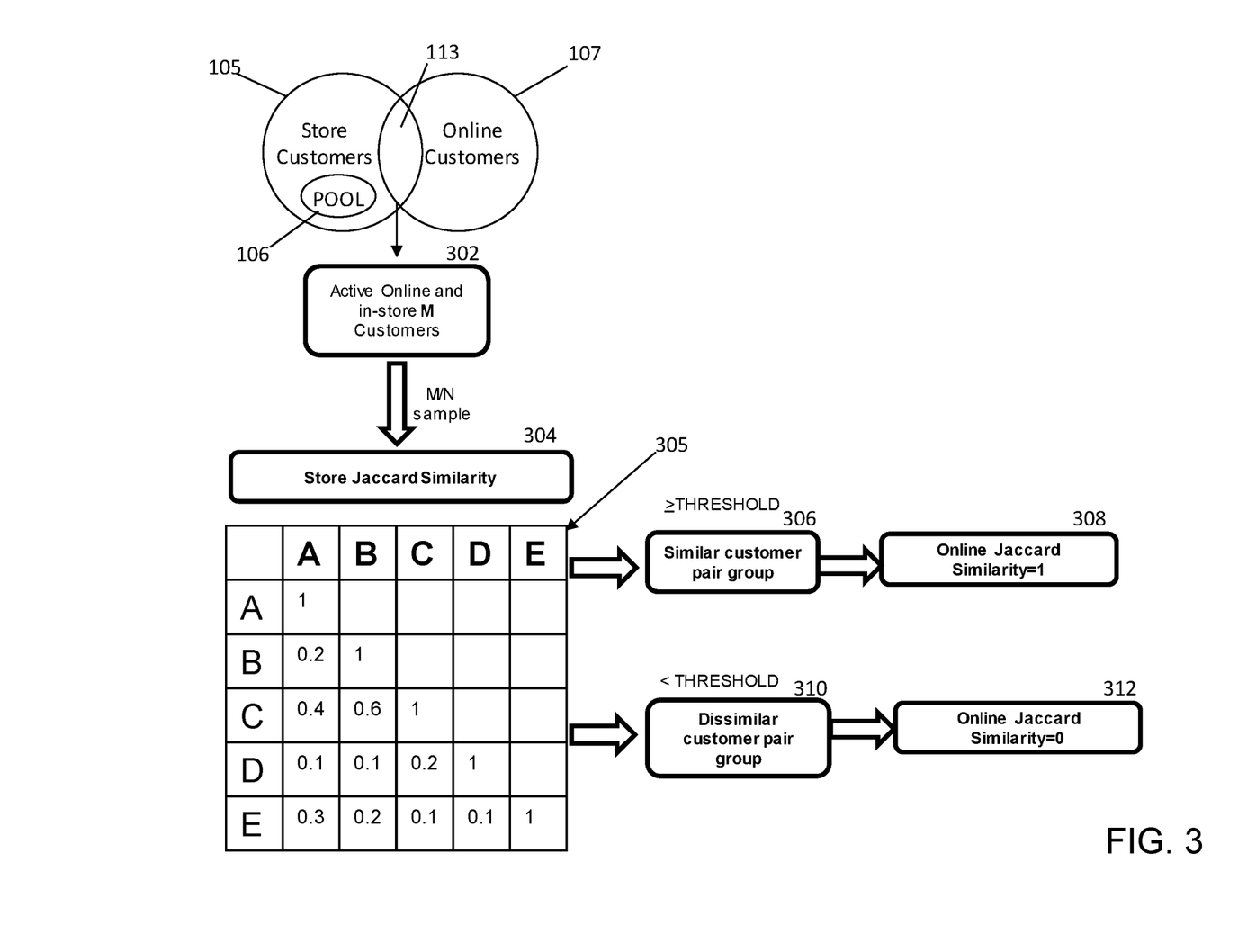
FIG. 3 is a schematic diagram of the similarity engine of FIG. 1.

FIG. 3 is a schematic diagram of an example of training a similarity engine 104 configured for computing the similarity score using Jaccard similarity. Jaccard similarity is defined by equation (1):

$$J(A, B) = \frac{|A \cap B|}{|A \cup B|} = \frac{|A \cap B|}{|A| + |B| - |A \cup B|} \quad (1)$$

where J(A,B) is the Jaccard similarity of two sample sets, A and B.

In some embodiments, the Jaccard similarity (a real number between 0.0 and 1.0) is determined according to equation (1), and a binary "online Jaccard similarity" is assigned an integer value of "1" if a customer from the pool has at least one match with at least one online and in-store customer, and a value of "0" if the customer has no match with any online and in-store customer.

At block 302, similarity engine 104 selects a training sample 108 of M customers (e.g., 20,000 customers) from among the intersecting set of active customers 113 who have both in-store and online purchase histories (e.g., 200,000 customers).

At block 304, the Jaccard similarity values are stored in an array 305. As shown in table 305, the similarity values range between 0.0 and 1.0. A similarity value of 1.0 means that an in-store shopper has an identical in-store purchase history with a member of the intersecting set 113 of shoppers who have both in-store and online purchase histories.

The values in the similarity array 305 can be compared directly to a user defined threshold. A lower threshold increases the absolute number of conversions. A higher threshold increases advertising cost efficiency.

If the similarity score is greater than or equal to the predetermined threshold, steps 306 and 308 are executed. If the similarity score is less than the predetermined threshold, steps 310 and 312 are executed At step 306, the in-store customer from the training sample 108 is found to have a similar in-store purchase history to another customer in the training sample 108.

At step 308, the (binary) online Jaccard similarity is assigned a value of 1.

At step 310, the in-store customer from the training sample 108 is found to have a dissimilar in-store purchase history from other customers in the training sample 108.

At step 312, the (binary) online Jaccard similarity is assigned a value of 0.

The look-alike model 102 can be based on customer pair, using a "One-hot expression" method, or a "Matching times" method, as described below.

A general similarity score between 0 and 1 for any two of the entity's customers u and v can be given by Sim(u, v)=$\Sigma_{i=1}^{N} w_i$ Store_Sim$_i$(u,v) where each feature i of the N store features has its own Similarity Score Store_Sim$_i$(u,v) for every pair of users (customers) u and v.

A second step trains a logistic regression model according to a second example with weights $w_i$, predictor variables as store-similarity features Store_Sim$_i$(u,v) and the target as the overall online similarity Online_Sim(u, v).

For gathering labelled data for training the model, customers can be selected to have both store and online purchase data so that the store purchase similarity acts as the target to predict online purchase similarity between user pairs u and v.

In a third step, the Jaccard similarity (a real number between 0.0 and 1.0) is determined as described above, and a binary "online Jaccard similarity" is assigned an integer value of "1" if the Jaccard similarity is greater than the threshold value, and a value of "0" if the Jaccard similarity is not greater than the threshold value. The target variable y is Online Similarity Online_Sim(u, v) and the sign (+ or −) is determined as follows:

Positive sign (y=1)—Use pairs of labelled customers that have online similarity score Online_Sim(u, v) higher than a certain threshold Negative sign (y=0)—Use pairs of labelled customers that have similarity score Online_Sim(u, v)=0

For the Online Similarity Score computation, the Jaccard similarity can be determined using a Matching Times similarity approach. In embodiments using "matching times", the processor 101 is configured for computing the Jaccard similarity for one of the in-store purchasers in the subset 112 of the pool based on a number of common items purchased by the one of the in-store purchasers, and a quantity of each item purchased. The matching times similarity score can be computed as follows:

As an example let us have n purchase items available to purchase with item_ids item$_1$, item$_2$ . . . , item$_n$ and user u and user v buy the following number of items from each item_id u$_{item_1}$, u$_{item_2}$, . . . , u$_{item_n}$ and v$_{item_1}$, v$_{item_2}$, . . . , v$_{item_n}$ For matching times approach, we consider the minimum match of the number of items for each item_id bought and normalize it with the maximum match for each item_id.

$$\text{Online\_Sim}(u, v)_{MatchingTimes} = \frac{\sum_{i=1}^{n} \min(u_{item_i}, v_{item_i})}{\sum_{i=1}^{n} \max(u_{item_i}, v_{item_i})}$$

In some embodiments, the processor is configured for computing the Jaccard similarity for two of the in-store purchasers in the training sample 108 based on a number of items purchased by the one of the in-store purchasers, without regard to a quantity of each item purchased. To compute Jaccard Similarity using One-hot expression technique, we look at the every item_id equally, irrespective of the number of items of each item the user u or v has bought. An example of a comparison of the two similarity computations is provided below.

$$\text{Online\_Sim}(u, v)_{Jaccard} = \frac{\text{Intersection of Item\_ids } u \text{ and } v \text{ bought}}{\text{Union of Item\_ids } u \text{ and } v \text{ bought}}$$

Taking an example of u and v with the purchases shown below

| item_id | User u Purchase | User v Purchase |
|---------|-----------------|-----------------|
| item$_1$ | 2 | 3 |
| item$_2$ | 4 | 3 |
| item$_3$ | 0 | 1 |

$$\text{Online\_Sim}(u, v)_{Jaccard} = \frac{\text{Intersection of Item\_ids } u \text{ and } v \text{ bought}}{\text{Union of Item\_ids } u \text{ and } v \text{ bought}} = \frac{2}{3}$$

$$\text{Online\_Sim}(u, v)_{MatchingTimes} = \frac{\sum_{i=1}^{3} \min(u_{item_i}, v_{item_i})}{\sum_{i=1}^{3} \max(u_{item_i}, v_{item_i})} = \frac{2+3+0}{3+4+1} = \frac{5}{8}$$

According to a fourth step, once labeled data with labels y are obtained, the logistic regression model is trained:

$y = \Sigma_{i=1}^{N} w_i \text{Store\_Sim}_i(u,v)$

Store_Sim$_i$(u,v) for each feature i is computed similarly to Online_Sim(u,v) as either Jaccard Similarity or Matching Times similarity.

Features for store purchases used may be hierarchical organizations of items at department, category and sub-category level. In other embodiments, the features can be grouped and categorized differently.

After the lookalike model 102 has been trained using training sample 108, the similarity engine 104 can be used to identify in-store customers who have in-store activity similar to a seed set 125 that has made both in-store and online purchases. In some embodiments, the look-alike model 102 receives inputs including:

- A set 125 of seed customers: S, which may or may not overlap the training sample 108;
- A pool of available customers in online advertising system: U such as the pool 106;
- Each customer is represented by a bag of features based on store purchase records 114;

The look-alike model 102 calculates the similarity between a candidate customer from the pool 106 of in-store customers and a the members of the seed set 125, and then sorts the candidate customers outputs:

A set of customers A, where each customers' maximum similarity to the seed set S is above a predetermined threshold, according to equation 2:

$$A: \{u | \max_{v \in S} \text{Sim}(u,v) > \tau; u \in U\} \quad (2)$$

where u and v are customers. That is, each individual customer is compared to each individual member of the seed set 125, and the closest similarity to any member of the seed set 125 is identified.

Thus, the look-alike model 102 identifies the customers A, such that the processor 101 can request that an advertising platform try to display ads to customers in A.

In some embodiments, the lookalike model 102 provides a similarity score between 0 and 1 for every pair of the retailer's store customers u and v so that store customers with online data can be matched with store customers who have no online history.

Figure 4:
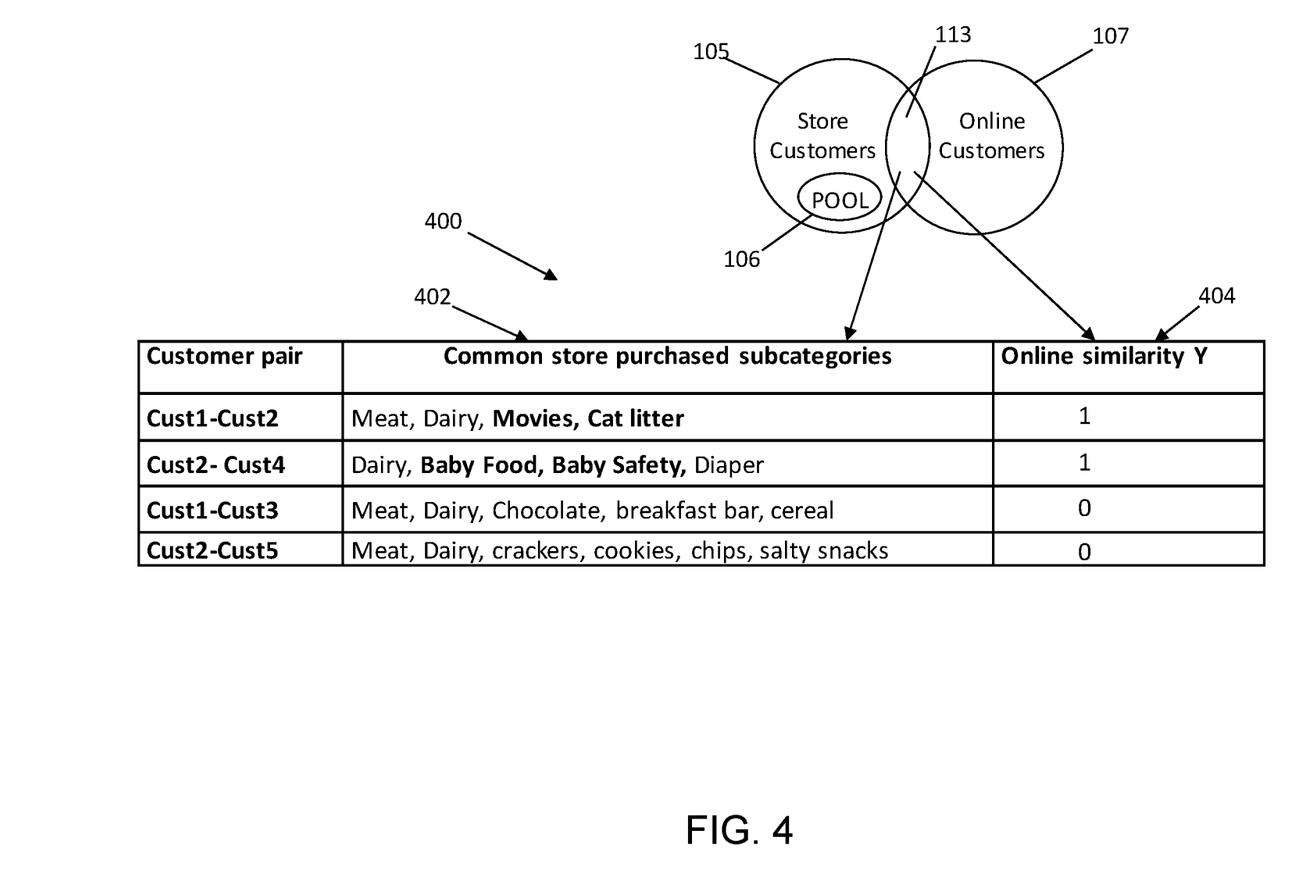
FIG. 4 is a schematic diagram showing an example of online similarity data produced by an embodiment of a similarity engine.

FIG. 4 is a schematic diagram showing an example of a similarity model that the similarity engine 104 can use. In FIG. 4, data from the intersection 113 of in-store customers and online customers are compared individually to each store customer in the pool 106. The results are tabulated in a table 400. Column 402 lists classifications of the goods that are compared. According to some embodiments, products are aggregated for purpose of determining whether two customers have similar purchasing histories. For example, the user may choose to aggregate similar items instead of comparing whether two customers purchased the same stock keeping unit (SKU). For example, strained bananas and strained green beans have different SKU numbers, but both fall within the category of baby food, and both are indicators of a parent who should be targeted for online baby food purchases. In general, the higher the level of abstraction of the classifications, the closer the similarity measures will be to 1.0, and the lower the level of abstraction of the classifications, the closer the similarity measures will be to 0.0.

In column 402, classifications that are shared by both customers are indicated by bold text, and products which are not shared are indicated in regular font. Column 404 is indicated as a binary decision. If the maximum similarity measure for an in-store customer is at least the threshold value, the "online similarity Y" result in column 404 is "1". If the maximum similarity measure for an in-store customer is less than the threshold value, the "online similarity Y" result in column 404 is "0". For example, the pair including customer 1 and customer 2 both purchased movies and cat litter. The pair including customer 2 and customer 4 both purchased baby food, baby safety and diaper items. On the other hand, customer 1 and customer 3 did not purchase any common products, and customer 2 and customer 5 did not purchase any common products.

Figure 5:
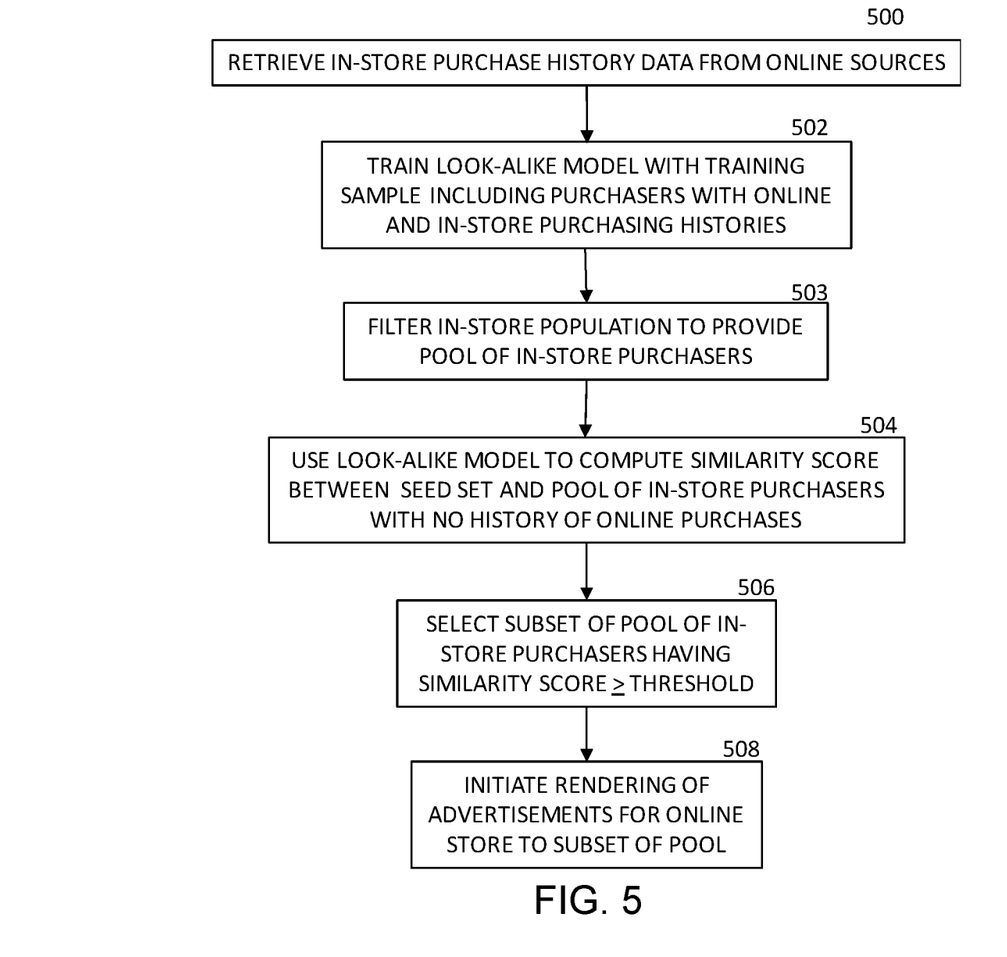
FIG. 5 is a high level flow chart of a method performed by the system of FIG. 1.

FIG. 5 is a high-level flow chart of an example of a method for targeting the advertising renderings.

At step 500, the system 100 retrieves in-store purchase history for a plurality of customers from the account/purchase records 114.

At step 502, the user trains the look-alike model 102 with a training sample 108 including a plurality of customers who have both in-store and online purchasing histories with the entity. The look-alike model can include a computer-implemented logistic regression model.

At step 503, the processor 101 uses filter(s) 103 for filtering a population 116 of in-store purchasers 105 having no history of online purchases from the online store 115 of the entity to provide the pool 106 of in-store purchasers, such that each in-store purchaser in the pool 106 has purchased at least one item from a selected class of items. In other embodiments, the processor 101 uses filter(s) 103 for filtering a population 116 of in-store purchasers having no history of online purchases from the online store of the entity to provide the pool 106 of in-store purchasers, such that each in-store purchaser in the pool belongs to a predetermined demographic group. The filters 103 can filter a population 116 of in-store purchasers having no history of online purchases from the online store 115 of the entity to provide the pool 106 of in-store purchasers, such that each in-store purchaser in the pool 106 has purchased at least one item from a selected class of items.

At step 504, the trained look-alike model 102 computes similarity scores between the plurality of customers in the seed set 125 (FIG. 1) within the intersecting set 113 and each purchaser within the pool 106 of in-store purchasers having a history of online purchases from an online store of an entity and a history of in-store purchases from stores of the entity. The similarity score can be computed using Jaccard similarity, based on in-store purchases of the customers in the seed set 125 and in-store purchases by in-store purchasers in pool 106. In some embodiments, the Jaccard similarity for one of the in-store purchasers in the subset 112 of the pool is computed based on a number of items purchased by the one of the in-store purchasers, without regard to a quantity of each item purchased. In other embodiments, the Jaccard similarity for one of the in-store purchasers in the subset 112 of the pool is computed based on a number of items purchased by the one of the in-store purchasers, and a quantity of each item purchased.

In the example of step 504 described above, the similarity engine 104 is based on Jaccard similarity. In other embodiments, the processor is configured for computing the similarity score using a different algorithm, such as local sensitive hashing or a k-d tree technique.

At step 506, the system selects a subset 112 of the pool 106 of in-store purchasers with no history of online purchases having similarity score above a predetermined threshold, based on the output of the look-alike model 102.

At step 508, the system initiates rendering of advertisements for the online store 115 to the selected subset 112 of the pool 106.

Figure 6:
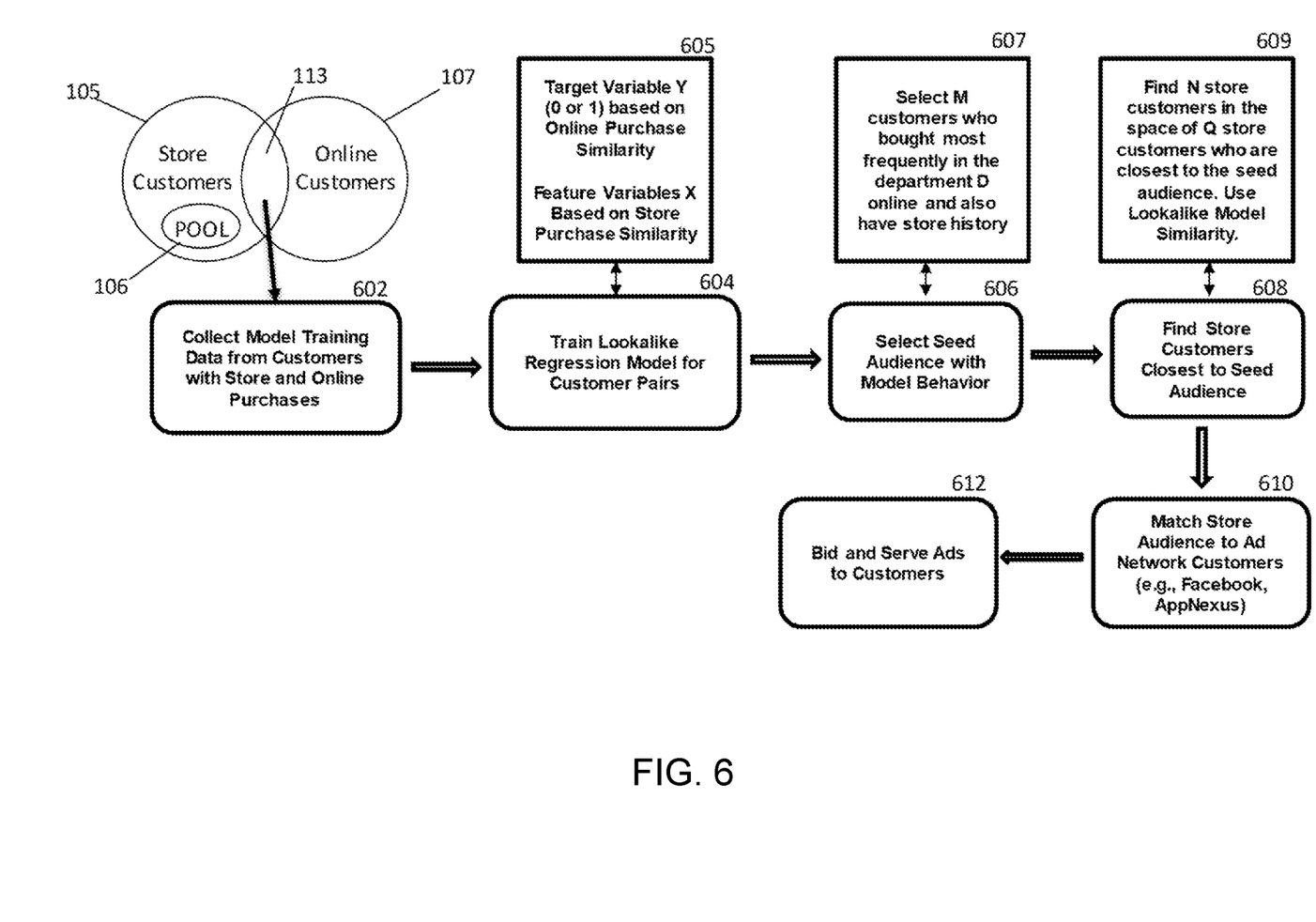
FIG. 6 is a detailed flow chart of a method performed by the system of FIG. 1.

FIG. 6 is a more detailed flow chart showing an embodiment.

At step 602, the system collects training data from customers having in-store and online purchase histories. For example, the system can automatically access data from the account/purchase records 114.

At step 604, the look-alike model is trained using a regression model for customer pairs from the intersecting subset 113 of customers having in-store and online purchase histories.

Step 605 shows an example of step 604, in which a binary target variable Y has a range of possible values including 0 and 1. The variable Y is associated with one or more feature variables X, based on purchase similarity. When the model is trained, given an input X identifying the in-store purchasing behavior of an in-store customer, the variable Y identifies whether, there is at least a threshold similarity between the in-store purchase behavior of that in-store customer and the in-store purchase behavior of one or more of the customers in the intersecting set 113, having both online and in-store purchases.

At step 606, a seed audience 125 (FIG. 1) is selected from the intersection 113 of in-store customers 105 and online customers 107, having the model behavior of in-store and online purchases.

Step 607 shows an example of step 606. The seed set 125 is selected to include M customers—M can be on the order of 10,000, for example—who most frequently bought products in the classification (e.g., department, category, or subcategory) to be advertised, and also have store histories of purchasing items.

At step 608, the similarity engine 104 finds the in-store customers from the pool 106 who are closer (most similar) to the seed audience 125 (within the intersecting set 113).

Step 609 provides an example of step 608. The look-alike model 102 selects N in-store customers from the population 116 of in-store customers—or from the pool 106 of in-store customers, if filter(s) 103 is (are) applied to the population 116 to reduce execution time—who are closest to the seed audience 125. For example, from a population 116 of 50 million in-store customers, the look-alike model 102 can select the closest 100,000 in-store customers as the subset 112 of the pool 106 included in the target audience.

In step 610, the processor 101 obtains information identifying online accounts of the customers in the subset 112 of the pool 106 from a consumer credit reporting agency 120 (e.g., Experian). The consumer credit reporting agency 120 can identify account IDs on social media 123, a programmatic online advertising platform 121 (e.g., AppNexus), or a personalized retargeting company 122 (e.g., Criteo). The processor 101 then matches the platforms at which the subset 112 of customers in the pool 106 have valid accounts against the list of online platforms on which the entity advertises.

At step 612, the processor 101 can bid and serve advertisements for the online store 115 on the matching online platforms identified in in step 610

In some embodiments, a non-transitory, machine readable storage medium 270 (FIG. 2) is encoded with program instructions, such that when the program instructions (e.g., software 226, FIG. 1) are executed by a processor 101, 230, the processor performs a method for targeting advertising, comprising: training a computer-implemented look-alike model 102 (FIG. 1) with a training sample 108 including a plurality of customers, each of the plurality of customers having a history of online purchases from an online store of an entity and a history of in-store purchases from stores of the entity; using the trained look-alike model 102 to compute a similarity score between the plurality of customers in a seed set 125 of customers—having a history of online purchases from an online store of an entity and a history of in-store purchases from stores of the entity—and each in-store purchaser within a pool 106 of in-store purchasers having no history of online purchases from the online store 115 of the entity; selecting a subset 112 of the pool 106 of in-store purchasers having similarity score above a predetermined threshold; and initiating rendering of advertisements for the online store 115 to the subset 112 of the pool of in-store purchasers.

The similarity score can be computed using Jaccard similarity. The Jaccard similarity for one of the in-store purchasers in the subset 112 of the pool can either be computed based on a number of items purchased by the one of the in-store purchasers, and a quantity of each item purchased, or without taking the quantity into account.

In the system and method described above, the similarity engine 104 computes similarity based on the in-store purchases of the seed set 125 and the pool 106. In another embodiment, accuracy may be improved by including demographic information, such as age, gender, and size of household.

The look-alike model can use a logistic regression engine, which can be trained with N store purchase features and M demographic features. For example, the computation can be made using equation (3):

$$y = \Sigma_{i=1}^{N} w_i \text{Store\_Sim}_i(u,v) + \Sigma_{j=1}^{M} w_j \text{Dem\_Sim}_j(u,v) \qquad (3)$$

where $\text{Dem\_Sim}_i(u,v)$ is the similarity score for demographic data. For demographic features such as age and gender, correlation based similarity metrics can be used.

Computing the similarity metric for each pair of users of a large population 116 may be computationally expensive. Other embodiments may be adapted for a very large pool 106, given a large population 116 to be matched to the seed audience 125 of the intersecting set 113.

Speeding Similarity Computation:

To reduce computation time for the similarity metric, approximate distances can be computed using Local Sensitive Hashing or k-d Tree based techniques.

Reduce Target Audience Size by Segmenting:

Alternatively, the size of the pool 106 can be reduced by pre-filtering the population 116 with shopping behavior in the categories and demographics of interest for the advertising campaign. For example, if the campaign is directed to designer diapers, the filters 103 can exclude customers who have not made any in-store purchases of baby products. Reducing the size of the pool 106 improves performance substantially.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a memory having instructions stored thereon, and a processor configured to read the instructions to:
filter, by the processor, customer records in a population set to generate a pool of customer records having no purchase records associated with online purchases from an online store;
compute a similarity score between a plurality of customer records in a seed set and the filtered pool of customer records having no purchase records associated with online purchases from the online store, wherein each customer record in the seed set includes at least one purchase record associated with online purchases and at least one purchase record associated with in-store purchases, wherein the similarity score is computed using a matching times similarity approach, wherein the matching times similarity approach considers a minimum match of a number of items for each item in each purchase record associated with online purchases normalized to a maximum match for each item in each purchase record associated with online purchases, wherein the similarity score is calculated by a trained similarity engine, and wherein the similarity engine is trained using a training set of customer records each including at least one purchase record associated with online purchases and at least one purchase record associated with in-store purchases;
select, based on the matching times similarity approach, a subset of the filtered pool of customer records having similarity scores above a predetermined threshold; and
initiate rendering of a webpage including content related to the online store to at least one device associated with the subset of the filtered pool of customer records.

2. The system of claim 1, wherein computing of the similarity score is based on purchase records associated with in-store purchases of the customer records in the seed set and purchase records associated with in-store purchases of the customer records in the filtered pool.

3. The system of 2, wherein the similarity score is calculated using Jaccard similarity.

4. The system of 3, wherein the Jaccard similarity is calculated for each of the customer records in the filtered pool of customer records based on a number of items included in purchase records associated with the filtered pool of customer records, without regard to a quantity of each item purchased.

5. The system of 3, wherein the Jaccard similarity is calculated for each of the customer records in the filtered pool of customer records based on a number of items included in purchase records associated with the filtered pool of customer records and a quantity of each item purchased.

6. The system of claim 2, wherein the similarity score is calculated using local sensitive hashing or a k-d tree technique.

7. The system of 1, wherein the processor filtering of customer records in the population set to generate the filtered pool of customer records having no purchase records associated with online purchases from the online store further comprises filtering such that each customer record in the filtered pool includes at least one purchase record including at least one item from a selected class of items.

8. The system of 1, wherein the processor filtering of customer records in the population set to generate the filtered pool of customer records having no purchase records associated with online purchases from the online store further comprises filtering such that each customer record in the filtered pool is associated with a predetermined demographic group.

9. A method, comprising:
training, by a processor, a computer-implemented look-alike model with a training sample including a first plurality of customer records, each of the first plurality of customer records having purchase records associated with online purchases from an online store and purchase records associated with in-store purchases, wherein the computer-implemented look-alike model is configured to implement a matching times similarity approach, wherein the matching times similarity approach considers a minimum match of a number of items for each item in each purchase record associated with online purchases normalized to a maximum match for each item in each purchase record associated with online purchases;
filtering, by the processor, customer records in a population set to generate the pool of customer records having no purchase records associated with online purchases from an online store;
using, by the processor, the trained look-alike model to compute a similarity score between a seed set including a second plurality of customers and each customer record within the filtered pool of customer records having no purchase records associated with online purchases from the online store, wherein each of the second plurality of customer records includes purchase records associated with online purchases and purchase records associated with in-store purchases;
selecting, by the processor, a subset of the filtered pool of customer records having similarity score above a predetermined threshold; and
initiating, by the processor, rendering of a webpage including content related to the online store to at least one device associated with the subset of the filtered pool of customer records.

10. The method of claim 9, wherein the look-alike model includes a computer-implemented logistic regression model.

11. The method of claim 9, wherein the similarity score is computed based on purchase records related to in-store purchases of the customer records in the seed set and purchase records related to in-store purchases of the customer records in the filtered pool.

12. The method of 11, wherein the similarity score is computed using Jaccard similarity.

13. The method of 12, wherein the Jaccard similarity each of the customer records in the filtered pool is computed based on a number of items included in purchase records associated with the filtered pool of customer records, without regard to a quantity of each item purchased.

14. The method of 12, wherein the Jaccard similarity each of the customer records in the filtered pool is computed based on a number of items included in purchase records associated with the filtered pool of customer records and a quantity of each item purchased.

15. The method of 12, wherein the similarity score is computed using local sensitive hashing or a k-d tree technique.

16. The method of 9, wherein filtering, by the processor, customer records in a population set to generate the filtered pool of customer records having no purchase records associated with online purchases from the online store further comprises filtering such that each customer record in the filtered pool includes at least one purchase record including at least one item from a selected class of items.

17. The method of 9, wherein filtering, by the processor, customer records in a population set to generate the filtered pool of customer records having no purchase records associated with online purchases from the online store further comprises filtering such that each customer record in the filtered pool is associated with a predetermined demographic group.

18. A non-transitory, machine readable storage medium encoded with program instructions, such that when the program instructions are executed by a processor, the processor performs a method, comprising:

training a computer-implemented look-alike model with a training sample including a first plurality of customer records, each of the first plurality of customer records having purchase records associated with online purchases from an online store and purchase records associated with in-store purchases, wherein the computer-implemented look-alike model is configured to implement a matching times similarity approach, wherein the matching times similarity approach considers a minimum match of a number of items for each item in each purchase record associated with online purchases normalized to a maximum match for each item in each purchase record associated with online purchases;

filtering, by the processor, customer records in a population set to generate a pool of customer records having no purchase records associated with online purchases from the online store;

using the trained look-alike model to compute a similarity score between a seed set including a second plurality of customers and each customer record within the filtered pool of customer records having no purchase records associated with online purchases from the online store, wherein each of the second plurality of customer records includes purchase records associated with online purchases and purchase records associated with in-store purchases;

selecting a subset of the filtered pool of customer records having similarity score above a predetermined threshold; and initiating rendering of a webpage including content related to the online store to at least one device associated with the subset of the filtered pool of customer records.

19. The method of 18, wherein the similarity score is computed using Jaccard similarity, and the Jaccard similarity of each the customer records in the filtered pool is computed based on a number of items included in purchase records associated with the filtered pool of customer records and a quantity of each item purchased.

20. The system of 18, wherein the processor filtering of customer records in a population set to generate the filtered pool of customer records having no purchase records associated with online purchases from the online store further comprises filtering such that each customer record in the filtered pool includes at least one purchase record including at least one item from a selected class of items.

\* \* \* \* \*